United States Patent
Takedomi et al.

(10) Patent No.: US 6,988,575 B2
(45) Date of Patent: Jan. 24, 2006

(54) VIBRATION-PROOF STRUCTURE FOR METALLIC ELECTRICAL PACKAGING CASE

(75) Inventors: Harumi Takedomi, Wako (JP); Osamu Hasegawa, Wako (JP); Toshiyuki Matsuoka, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 42 days.

(21) Appl. No.: 10/295,152

(22) Filed: Nov. 14, 2002

(65) Prior Publication Data

US 2003/0098191 A1 May 29, 2003

(30) Foreign Application Priority Data

Nov. 28, 2001 (JP) ......................... 2001-363355

(51) Int. Cl.
*B60R 16/04* (2006.01)

(52) U.S. Cl. ................... 180/68.5; 180/65.1; 248/674
(58) Field of Classification Search ............... 180/65.1, 180/65.2, 68.5, 291, 299, 300; 248/675, 674
See application file for complete search history.

(56) References Cited

U.S. PATENT DOCUMENTS 1,552,320 A * 9/1925 Lea ........................... 180/68.5
5,836,412 A * 11/1998 Lyles et al. ................ 180/65.1
6,108,202 A * 8/2000 Sumida ...................... 361/690
6,189,957 B1 * 2/2001 Matsui et al. ............... 296/192
6,371,229 B1 * 4/2002 Kakiuchi .................... 180/65.2
6,541,151 B2 * 4/2003 Minamiura et al. ........... 429/98
6,662,891 B2 * 12/2003 Misu et al. ................. 180/68.1

FOREIGN PATENT DOCUMENTS

| EP | 1 034 956 | 9/2000 |
|---|---|---|
| EP | 1034956 A2 * | 9/2000 |
| JP | 3-139454 | 6/1991 |
| JP | 7-285391 | 10/1995 |
| JP | 10-53028 | 2/1998 |
| JP | 2000-238541 | 9/2000 |
| JP | 2002-205556 | 7/2002 |

* cited by examiner

*Primary Examiner*—Christopher P. Ellis
*Assistant Examiner*—Christopher Bottorff
(74) *Attorney, Agent, or Firm*—Hamre, Schumann, Mueller & Larson, P.C.

(57) ABSTRACT

A vibration-proof structure for a metallic electrical packaging case includes a metallic electrical packaging case and a coupling member. The coupling member connects an outer wall of the metallic electrical packaging case and a member forming a side wall of a vehicle. Also, the coupling member may include an engaging portion at one end of the coupling member, which is used for temporarily fixing the coupling member, and an insertion engaging portion, which is engaged with a portion of the member forming the side wall of the vehicle, formed at another end of the coupling member.

7 Claims, 8 Drawing Sheets

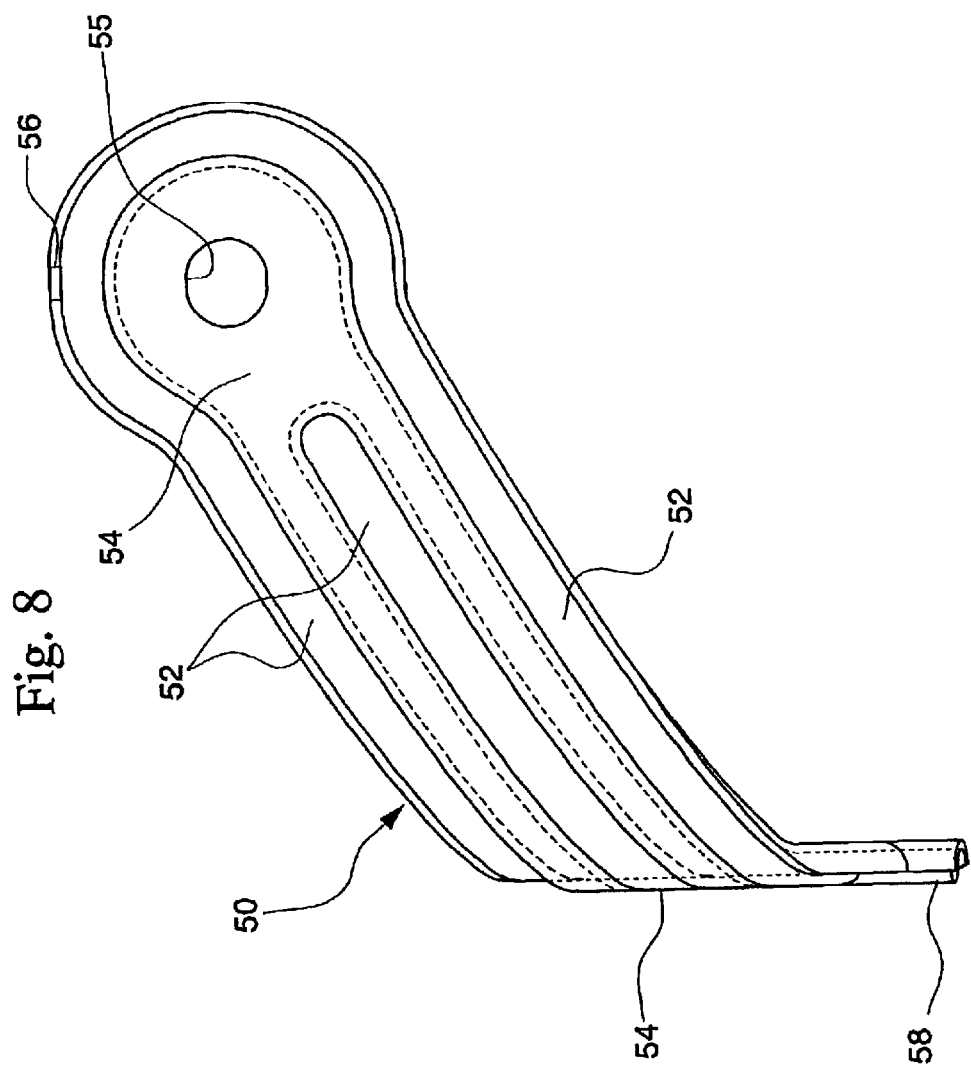

VIBRATION-PROOF STRUCTURE FOR METALLIC ELECTRICAL PACKAGING CASE

BACKGROUND OF THE INVENTION

1. Field of the Invention

The present invention relates to a vibration-proof structure for a metallic electrical packaging case in which high voltage electronic parts used for hybrid vehicles, for example, may be accommodated. More specifically, the present invention relates to a vibration-proof structure for a metallic electrical packaging case by which quietness in the interior of a vehicle may be maintained.

2. Description of Related Art

Vehicles, such as hybrid vehicles, in which the engine is driven being assisted by the motor and the motor is used as a generator during deceleration to collect electric power, are conventionally known. Such vehicles are normally provided with large high voltage electrical parts, for instance, a battery and an inverter, exclusive to the vehicles, and various contrivance have been made for the arrangement of these electronic parts. It is effective to utilize available space in the vehicle for the arrangement of the electronic parts, and a proposal has been made to accommodate the high voltage electronic parts in a metallic electrical packaging case, for instance, and to place it at a rear portion of the interior of a vehicle.

However, if such a large metallic electrical packaging case is simply placed in the vehicle, the heavy metallic electrical packaging case may vibrate due to the vibration caused by the engine or by running on the road, and humming noise is generated from the electrical packaging case. Accordingly, there is a problem that the quietness inside the vehicle cannot be maintained. Also, although it is conceivable to improve the rigidity of the metallic electrical packaging case by increasing the thickness of a plate forming the outer wall of the case in order to prevent the humming noise, this leads to a significant increase in the weight of the case.

SUMMARY OF THE INVENTION

Accordingly, an object of the invention is to provide a vibration-proof structure for a metallic electrical packaging case by which the generation of humming noise can be surely prevented without increasing the weight of the case, and which may be readily attached to the vehicle.

In order to achieve the above object, the first aspect of the present invention provides a vibration-proof structure for a metallic electrical packaging case including a metallic electrical packaging case (for instance, a high voltage electrical packaging case 20 in an embodiment described later), and a coupling member (for instance, coupling members 40 and 50 in the embodiment described later) which connects an outer wall (for instance, an exterior casing 21 in the embodiment described later) of the metallic electrical packaging case and a member (for instance, a wheel house 9 in the embodiment described later) forming a side wall of the vehicle.

According to the above vibration-proof structure for a metallic electrical packaging case, since the metallic electrical packaging case may be supported by the member forming the side wall of the vehicle via the coupling members, the resonance frequency of the high voltage electrical packaging case is increased, and the generation of humming noise due to the structural resonance may be surely prevented. Accordingly, quietness in the interior of the vehicle may be surely maintained.

Also, according to the above coupling members connecting the outer wall of the metallic electrical packaging case, which may be placed at the rear portion of the interior of the vehicle, the coupling members enable to avoid increasing the weight thereof and making narrow the interior space of the vehicle.

In accordance with the second aspect of the present invention, the coupling member of the above vibration-proof structure for a metallic electrical packaging case includes an engaging portion (for instance, projections 46 and 56 in the embodiment described later) used for temporarily fixing the coupling member, the engaging portion being disposed at one end of the coupling member; and an insertion engaging portion (for instance, fixing portions 47 and 57 in the embodiment described later) which is engaged with a portion of the member forming the side wall of the vehicle, the insertion engaging portion being disposed at another end of the coupling member.

According to the above vibration-proof structure for a metallic electrical packaging case, it becomes possible to temporarily fix the coupling members readily and surely to the assembly position thereof by engaging the engaging portion formed on one end of the coupling member with the outer wall of the metallic electrical packaging case or the member forming the side wall of the vehicle, and sliding and engaging the insertion engaging portion formed at the other end of the coupling member with the member forming the side wall of the vehicle or the outer wall of the metallic electrical packaging case. Accordingly, the assembling process for the coupling member may be readily carried out.

In accordance with the third aspect of the present invention, the member forming a side wall of the vehicle is a wheel house.

According to the above vibration-proof structure for a metallic electrical packaging case, it becomes possible to reduce the size of the coupling members by effectively utilizing the wheel houses, which extend towards the inside the vehicle and are located in the vicinity of the high voltage electrical packaging case. Accordingly, increase in weigh of the vehicle may be prevented.

In accordance with the fourth aspect of the present invention, the above vibration-proof structure for metallic electrical packaging case further includes a sealing member which is provided with the metallic electrical packaging case.

In accordance with the fifth aspect of the present invention, the metallic electrical packaging case is placed between a rear seat and a trunk of the vehicle.

In accordance with the sixth aspect of the present invention, the vibration-proof structure for metallic electrical packaging case is applied to a cooling device.

BRIEF DESCRIPTION OF THE DRAWINGS

Some of the features and advantages of the invention have been described, and others will become apparent from the detailed description which follows and from the accompanying drawings, in which:

FIG. 8 is a diagram showing the above coupling member viewed from the direction indicated by the arrow B in FIG. 7.

DETAILED DESCRIPTION OF THE INVENTION

The invention summarized above and defined by the enumerated claims may be better understood by referring to the following detailed description, which should be read with reference to the accompanying drawings. This detailed description of particular preferred embodiments, set out below to enable one to build and use particular implementations of the invention, is not intended to limit the enumerated claims, but to serve as particular examples thereof.

Hereinafter, the vibration-proof structure for a metallic electrical packaging case according to an embodiment of the present invention will be described with reference to the accompanying drawings.

Figure 1:
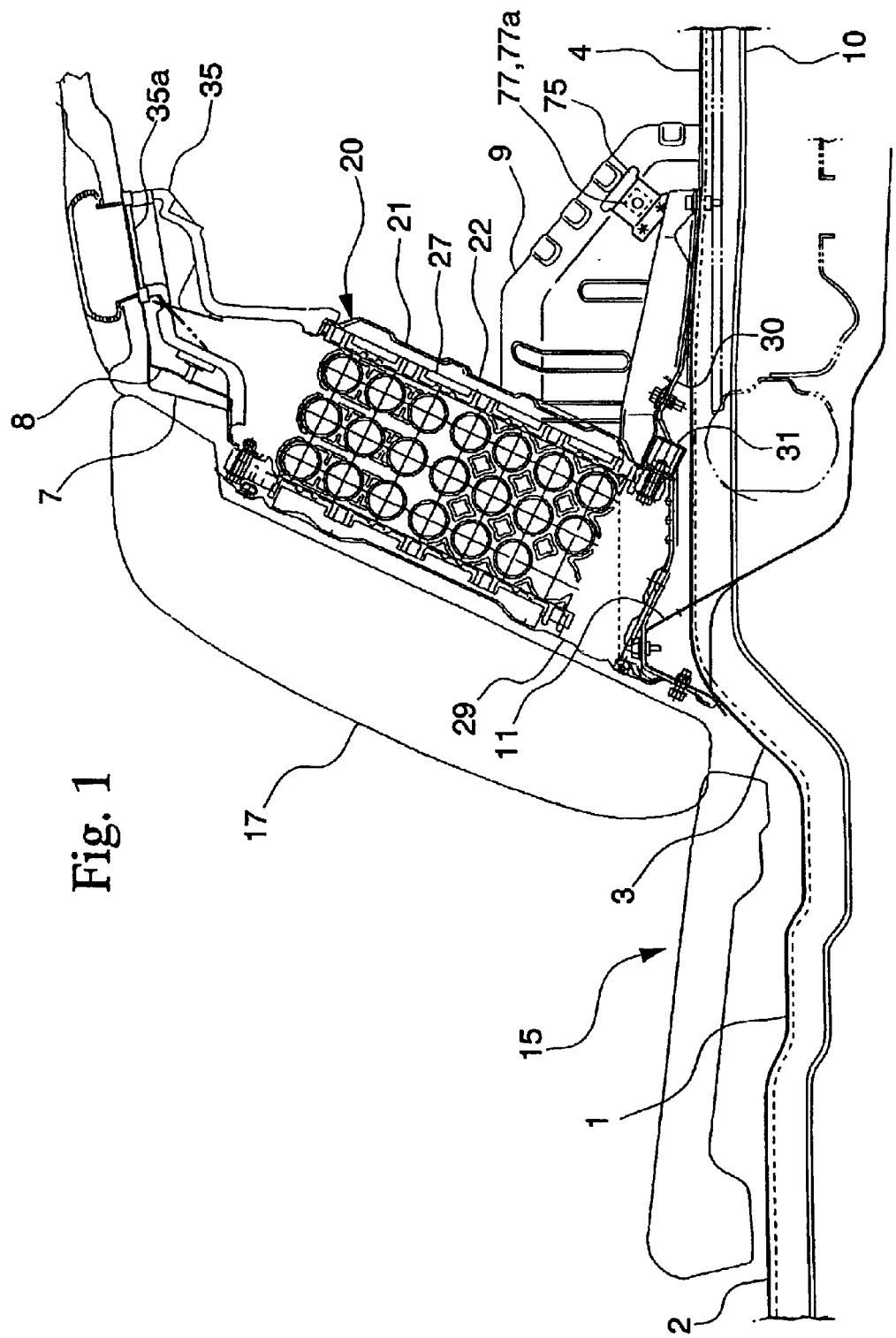
FIG. 1 is a schematic diagram for explaining a side view of a hybrid vehicle to which a vibration-proof structure for a metallic electrical packaging case according to an embodiment of the present invention is applied.

FIG. 1 is a schematic diagram for explaining a side view of a hybrid vehicle to which a vibration-proof structure for metallic electrical packaging case according to the embodiment of the present invention is applied. As shown in FIG. 1, a floor panel 1 includes a trunk floor 4 which extends upwardly from an interior floor 2 via an inclined portion 3. A side frame 10 which extends in the front to back direction of the vehicle is joined to each side of the lower surface of the floor panel 1, and forms a vehicle's main frame together with a cross member 11 which is provided so as to cross the side frames 10 at the upper surface of the inclined portion 3 of the floor panel 1.

A wheel house 9, which is provided so as to project towards the inside of the vehicle, is welded and joined to each side periphery of the trunk floor 4 of the floor panel 1 explained above. The wheel house 9 also functions as a vehicle side wall member for supporting a high voltage electrical packaging case 20, which will be described later.

A rear seat 15 is disposed at a rear portion of the interior floor 2 of the floor panel 1, and a large high voltage electrical packaging case 20 is disposed at the back of the rear seat 15 so as to fit along a seat back 17 of the rear seat 15.

The high voltage electrical packaging case 20, which is disposed at the rear portion of the vehicle, accommodates a battery box 27 at a left hand side and a heat sink case 28 at a right hand side in an exterior casing 21 made of a steel sheet, and a cover member 29 is attached to the front of the case 20 so as to airtightly close the case 20.

Note that a battery, which is a high voltage electronic part, is accommodated in the battery box 27, and an inverter, a DC/DC converter, an electrical control unit (ECU), etc., which are also high voltage electronic parts, are attached to the heat sink case 28.

Figure 2:
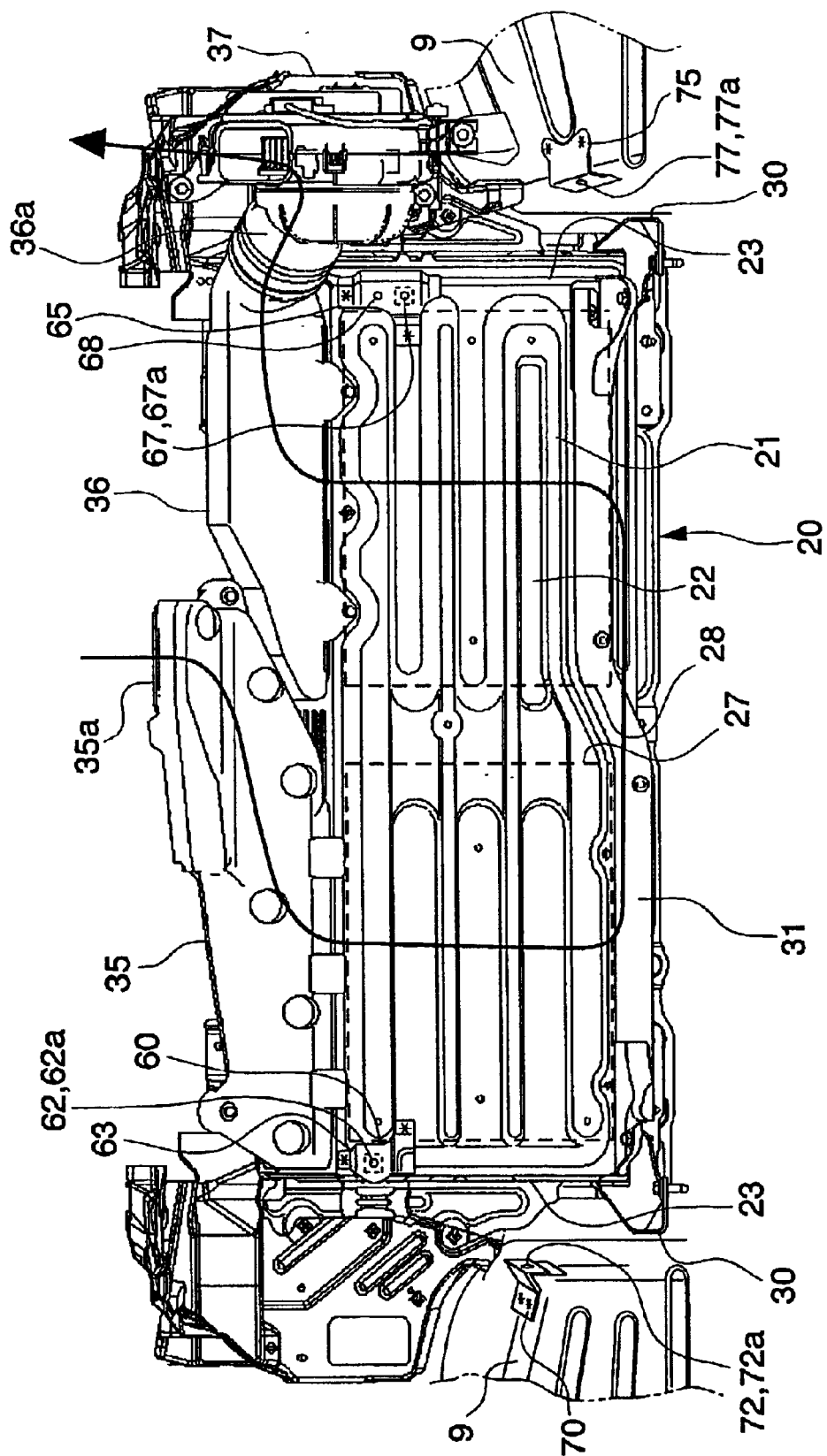
FIG. 2 is a diagram showing the above high voltage electrical packaging case and so forth from the back thereof.

FIG. 2 is a diagram showing the above-mentioned high voltage electrical packaging case 20 and so forth from the back thereof. As shown in FIG. 2, the high voltage electrical packaging case 20 is disposed between the wheel houses 9, and the exterior casing 21 is located in the vicinity of each of the right and left wheel houses 9.

An air intake-duct 35 and an air-exhaust duct 36 used for internal cooling are attached to the upper portion of the high voltage electrical packaging case 20. An air inlet 35a of the air intake-duct 35 is disposed at the interior of the vehicle, and a fan 37 is disposed at an air outlet 36a of the air-exhaust duct 36. When the fan 37 is operated, air inside the interior of the vehicle is drawn via the air inlet 35a and passes through the closed high voltage electrical packaging case 20 as indicated by the arrow in the figure to cool down the high voltage electronic parts.

As mentioned above, the high voltage electrical packaging case 20 through which the cooling air flows, includes a sealing structure at various parts thereof to increase cooling efficiency, and the exterior casing 21 is integrally formed to secure the airtightness.

As shown in FIG. 2, a patch member 60 for attaching a coupling member 40, which will be explained later, is welded and fixed to an upper left side of a rear wall 22 of the exterior casing 21. Also, a patch member 65 for attaching a coupling member 50, which will be explained later, is welded and fixed to an upper right side of the rear wall 22 of the exterior casing 21.

Each of the patch members 60 and 65 includes a flange portion which extends along the rear wall 22 and a side wall 23 of the exterior casing 21, and the flange portion is joined to the rear wall 22 and the side wall 23, respectively, by spot welding. In particular, the flange portion at the lower side of each of the patch members 60 and 65 extends along the rear wall 22 towards the center thereof in order to improve effect in preventing the tumbling of the high voltage electrical packaging case 20.

A hole 62 provided with a weld nut 62a at the back is formed at substantially the center portion of the patch member 60. Also, an engaging rack portion 63 is disposed above the hole 62 as shown in FIG. 2.

Similarly, a hole 67 provided with a weld nut 67a at the back is formed at substantially the center portion of the patch member 65. Also, an engaging hole 68 is formed above the hole 67.

Note that the holes 62 and 67 provided with the patch members 60 and 65, respectively, are formed with a constant interval from the rear wall 22 of the exterior casing 21.

On the other hand, brackets 70 and 75 are welded and fixed to the left hand side and the right hand side wheel houses 9, respectively, so as to correspond to the patch members 60 and 65.

Each of the brackets 70 and 75 forms a side wall, which is almost vertical to the floor panel 1 and the rear wall 22 of the exterior casing 21, and holes 72 and 77 provided with weld nuts 72a and 77a, respectively, are formed at the interior of the vehicle.

Note that the bracket 75 is positioned further back with respect to the bracket 70 in order to prevent interference with the fan 37.

In the high voltage electrical packaging case 20 having the above configuration, the upper portion thereof is supported by the rear tray 7 and a reinforcing member 8, and the lower portion thereof is supported by the right and left frame members 30 and the right and left side frames 10 and the cross member 11 via a cross beam 31 as shown in FIG. 1.

Figure 3:
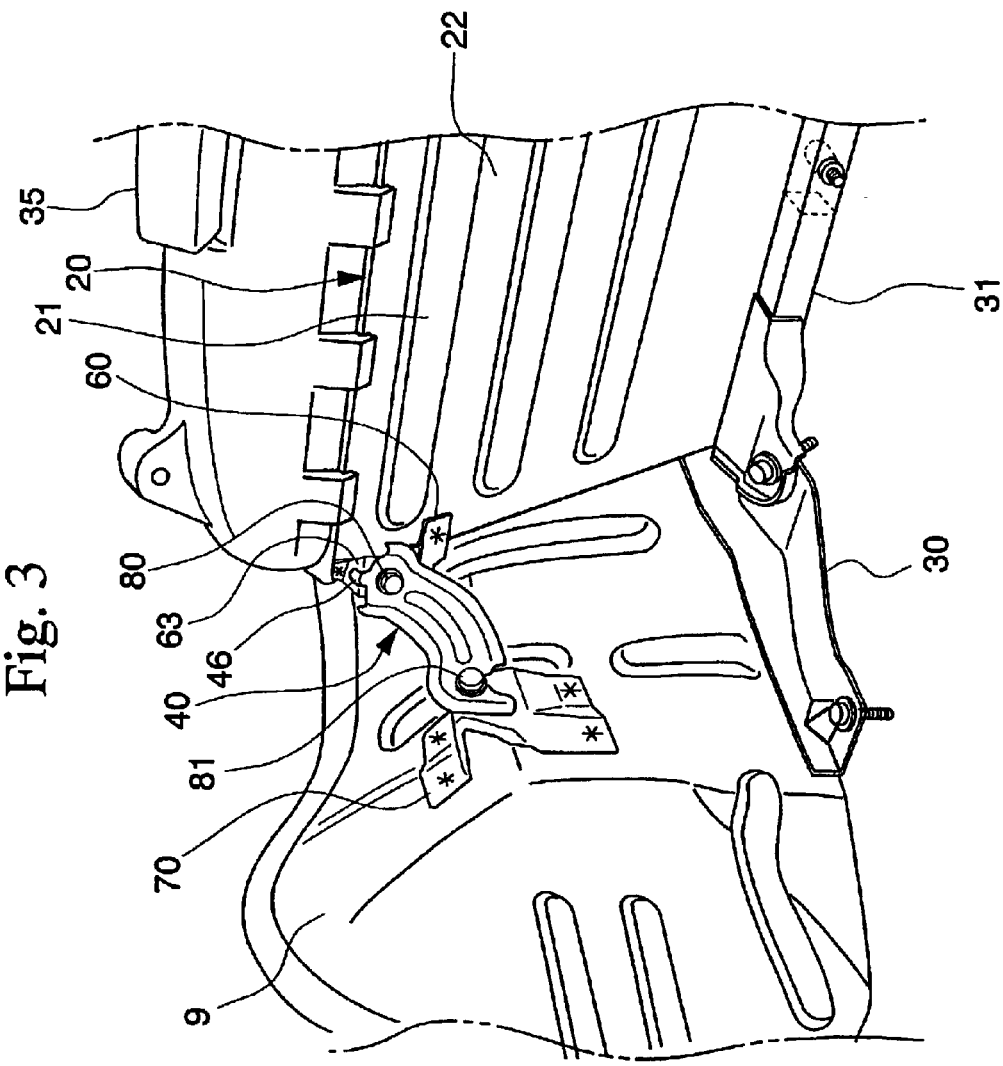
FIG. 3 is a diagram showing a perspective view of a portion of the high voltage electrical packaging case in the vicinity of a left wheel house viewed from the back of the interior of the vehicle.
Figure 4:
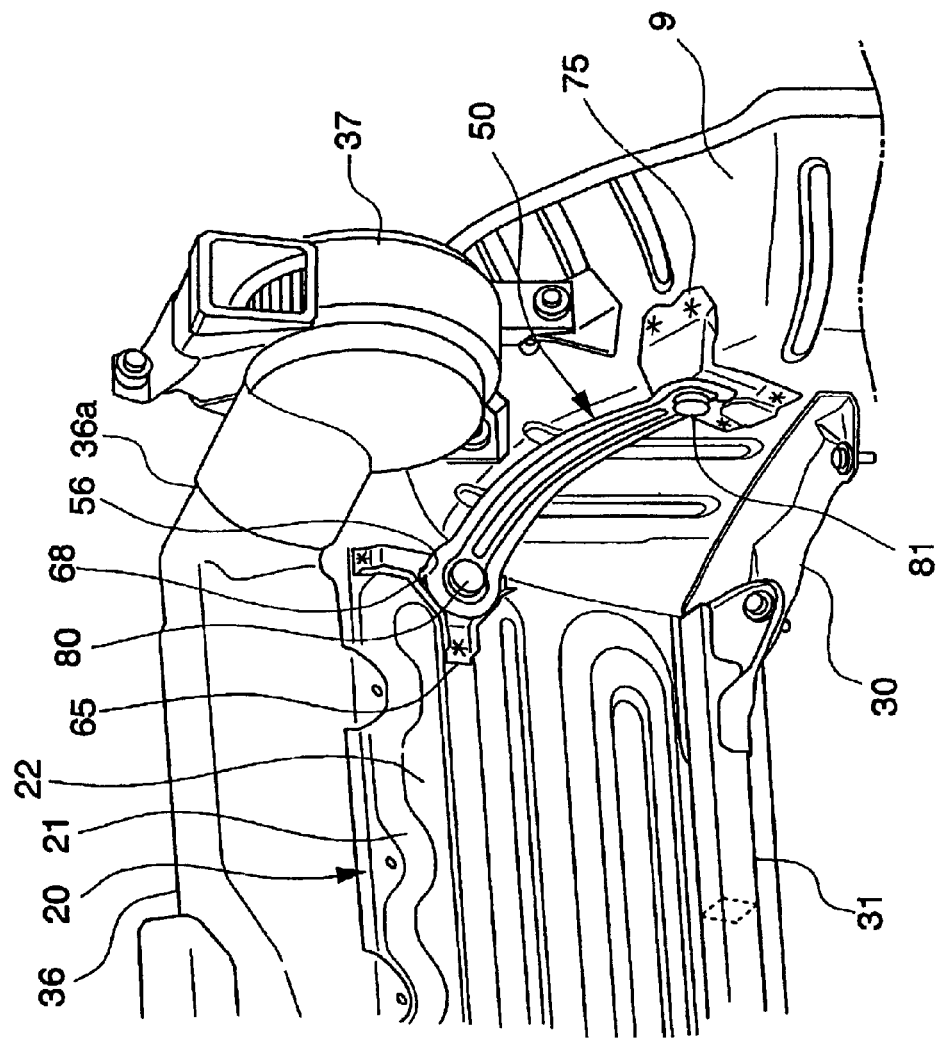
FIG. 4 is a diagram showing a perspective view of a portion of the high voltage electrical packaging case in the vicinity of a right wheel house viewed from the back of the interior of the vehicle.

FIG. 3 is a diagram showing a perspective view of a portion of the high voltage electrical packaging case 20 in the vicinity of a left wheel house viewed from the back of the interior of the vehicle. As shown in the figure, the coupling member 40 is detachably attached using bolts 80 and 81 between the patch member 60 at the upper left hand side of the high voltage electrical packaging case 20 and the bracket 70 of the left wheel house 9. Also, as shown in FIG. 4, the coupling member 50 is detachably attached using bolts 80 and 81 between the patch member 65 at the upper right hand side of the high voltage electrical packaging case 20 and the bracket 75 of the right wheel house 9.

Figure 5:
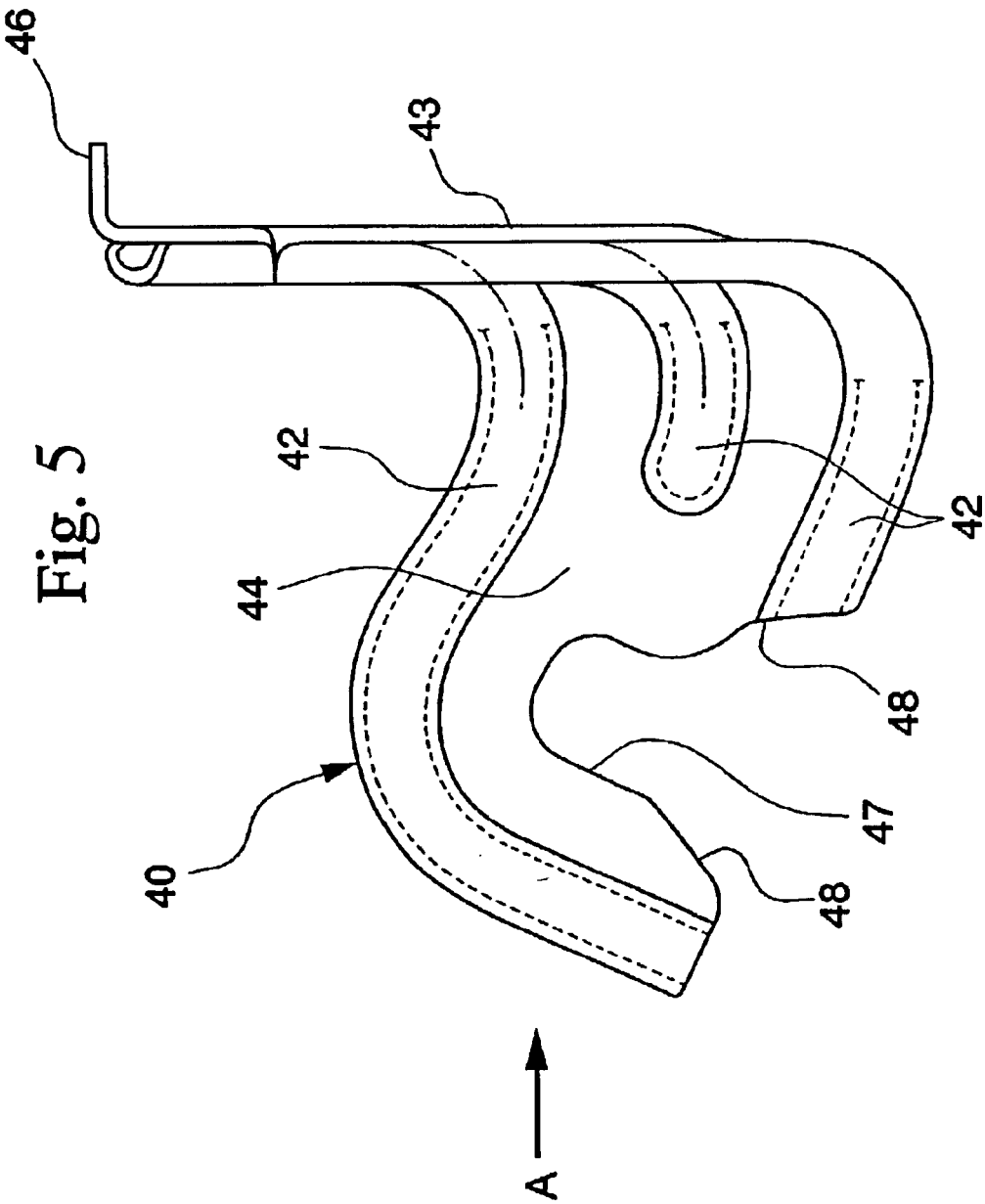
FIG. 5 is a diagram showing a side view of the coupling member at the left hand side according to the embodiment of the present invention.
Figure 6:
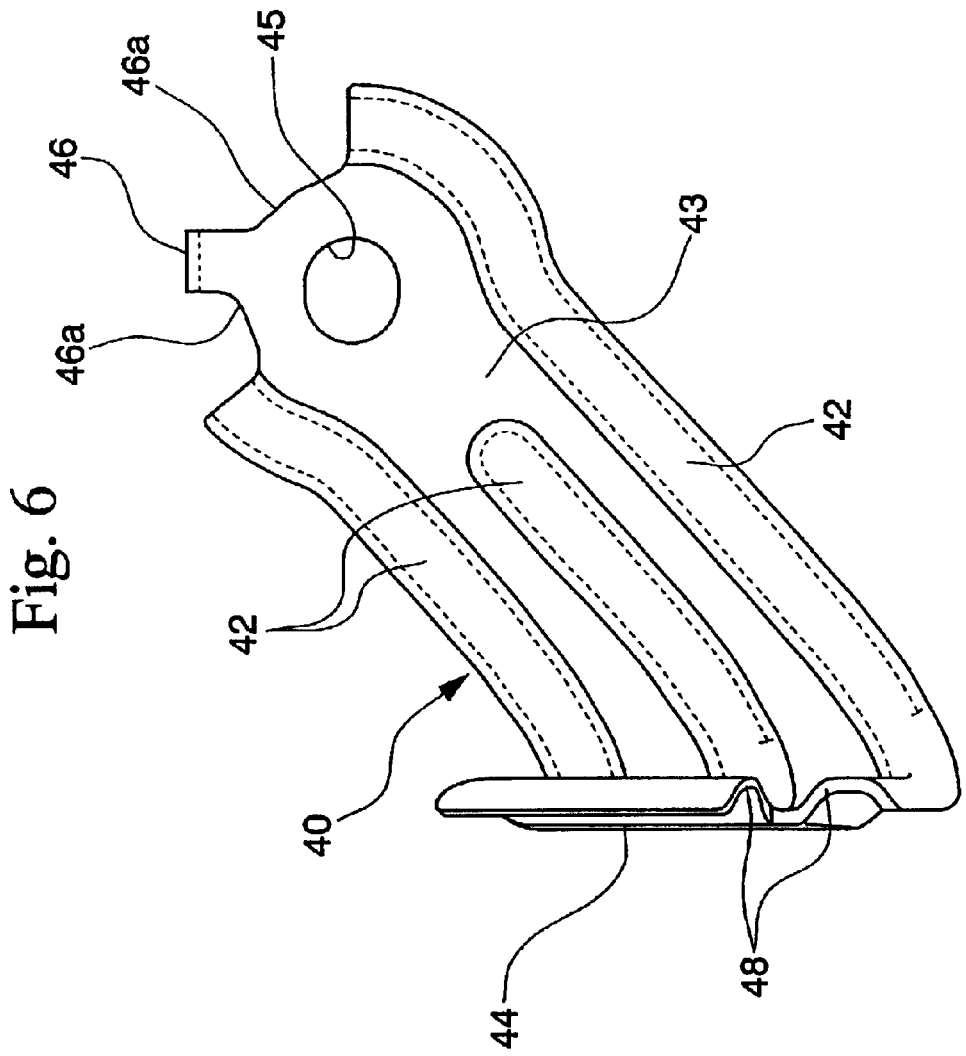
FIG. 6 is a diagram showing the above coupling member viewed from the direction indicated by the arrow A in FIG. 5.

FIG. 5 is a diagram showing a side view of the coupling member 40 at the left hand side, and FIG. 6 is a diagram showing the coupling member 40 viewed from the direction indicated by the arrow A in FIG. 5.

In the figures, the coupling member 40 is a member may be formed by press molding, and includes three beads 42 having a semicircular cross sectional shape disposed at the center and both periphery portions, and the beads 42 are smoothly bent in an almost vertical direction to form a front wall portion 43 and a side wall portion 44.

An elongated hole 45 which is elongated in the vehicle width direction is formed at the upper end potion of the front wall 43 at a position corresponding to the hole 62 of the patch member 60 in order to absorb an error in attachment in the vehicle width direction. Also, a projection 46, (an engaging portion) used for temporarily fixing, which corresponds to the engaging rack portion 63 of the patch member 60, is formed above the elongated hole 45 so as to be almost vertical to the front wall 43.

In order to secure a bearing surface for the bolt 80, the area around the hole 45 is somewhat enlarged, and the bead 42 at the center disappears around the hole 45. Also, the beads 42 at the periphery portions are formed so as to surround the hole 45 in order to increase the rigidity of the upper end portion of the front wall 43.

Note that notches 46a for press molding are provided at both sides of the projection 46. Accordingly, the projection 46 is located at the most upper end of the front wall 43 due to the presence of the notches 46, and hence it becomes easy to engage the projection 46 with the engaging rack portion 63 of the patch member 60 in an assembling process which will be described later.

On the other hand, a fixing portion 47 (an engaging portion) is formed at a rear end portion of the side wall 44 at a position corresponding to the hole 72 of the bracket 70. A guiding portion 48, which opens at the lower periphery side of the side wall 44 and extends in a V shape, is connected to the fixing portion 47 as shown in FIG. 5.

In order to secure a bearing surface for the bolt 81, the area around the fixing portion 47 is somewhat enlarged, and the bead 42 at the center disappears around the fixing portion 47. Also, the beads 42 at the periphery portions are formed so as to surround the hole 45 in order to increase the rigidity of the rear end portion of the side wall 44.

Note that the above-mentioned guiding portion 48 functions as a guide when the fixing portion 47 is slid and engaged with the bolt 81, which is temporarily fixed to the bracket 70 in an assembling process for the coupling member 40 which will be described later. Also, the fixing portion 47 is formed so as to be larger in the front and back direction of the vehicle with respect to the underhead size of the bolt 81 so that an error in attachment in the vehicle length direction may be absorbed.

Also, in the coupling member 40, the shape of the bent portion, which connects the front wall 43 and the side wall 44, is designed to be smoothly bent in the downward direction at an almost vertical angle in order to prevent interference with members inside the interior of the vehicle which are not shown in the figure.

Here, if the coupling member 40 has sufficient strength and rigidity to support the high voltage electrical packaging case 20, it is possible to reduce the weight of the coupling member 40 or prevent the interference with the other parts by decreasing the cross sectional width of portions thereof other than the upper end portion of the front wall 43 and the rear end portion of the side wall 44 having the bearing surface for the bolts 80 and 81, respectively.

Figure 7:
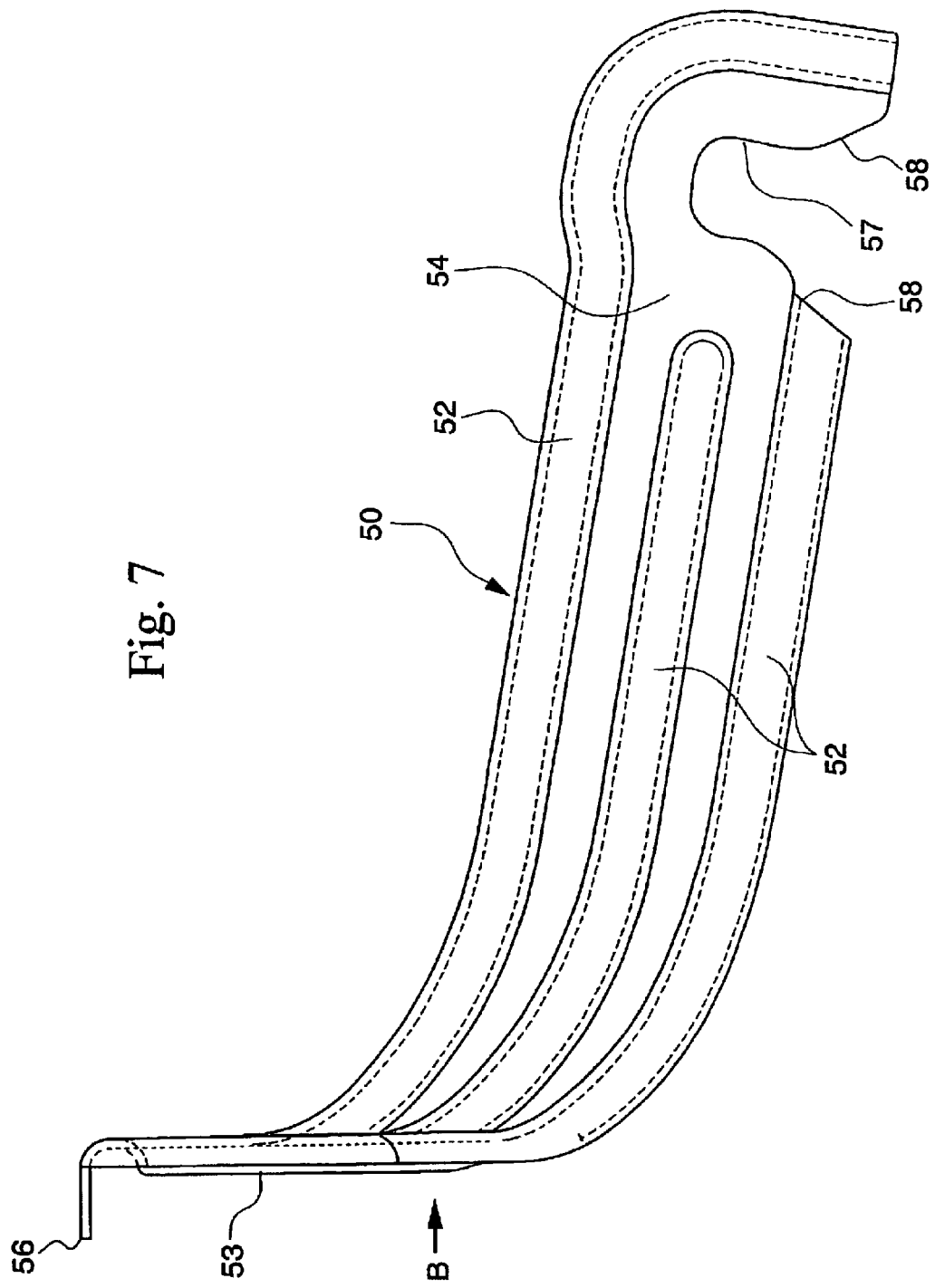
FIG. 7 is a diagram showing a side view of the coupling member at the right hand side according to the embodiment of the present invention.

FIG. 7 is a diagram showing a side view of the coupling member 50 at the right hand side, and FIG. 8 is a diagram showing the coupling member 50 viewed from the direction indicated by the arrow B in FIG. 7.

In the figures, the coupling member 50 is a member which may be formed by press molding in the same manner as for the coupling member 40, and includes three beads 52 having a semicircular cross sectional shape which are disposed at the center and both periphery portions, and the beads 52 are smoothly bent in an almost vertical direction to form a front wall portion 53 and a side wall portion 54. In this embodiment, as mentioned above, since the bracket 75 is located further back with respect to the bracket 70, the side wall portion 54 of the coupling member 50 in particular extends towards the back as compared with the coupling member 40.

An elongated hole 55 which is elongated in the vehicle width direction is formed at the upper end potion of the front wall 53 at a position corresponding to the hole 67 of the patch member 65 in order to absorb an error in attachment in the vehicle width direction. Also, a projection 56 (an engaging portion) used for temporarily fixing, which corresponds to the engaging hole 68 of the patch member 65, is formed above the elongated hole 55 so as to be almost vertical to the front wall 53.

Similar to the coupling member 40, the area around the hole 55 is somewhat enlarged, and the bead 52 at the center disappears around the hole 55. Also, the beads 52 at the periphery portions are formed so as to surround the hole 55 in order to increase the rigidity of the upper end portion of the front wall 53.

On the other hand, similar to the coupling member 40, a fixing portion 57 (an engaging portion) and a guiding portion 58 are formed at a rear end portion of the side wall 54. Also, the fixing portion 57 is formed so as to be large in the front and back direction of the vehicle with respect to the underhead size of the bolt 81 so that an error in attachment in the vehicle length direction may be absorbed.

Also, similar to the coupling member 40, the area around a notch is formed so as to become somewhat larger. The bead 52 at the center disappears at the middle, and the beads 52 at the periphery portions are formed so as to surround the hole 55.

Note also that if the coupling member 50 has sufficient strength and rigidity to support the high voltage electrical packaging case 20, it is possible to reduce the weight of the coupling member 50 or prevent the interference with the other parts by decreasing the cross sectional width of portions thereof other than the upper end portion of the front wall 53 and the rear end portion of the side wall 54 having the bearing surface for the bolts 80 and 81, respectively.

Next, the assembling procedure for the coupling member 40 will be explained with reference to FIG. 3.

First, the orientation of the coupling member 40 is maintained so as to be in a state more inclined towards the front as compared with the assembled state thereof, and the projection 46 used for temporarily fixing is engaged with the engaging rack portion 63 formed with the patch member 60 of the exterior casing 21.

At that time, the fixing portion 47 is located on a rotation track around the projection 46 as the center viewed from the side direction, and is located above the bracket 70 of the wheel house 9.

From this state, the coupling member 40 is rotated around the projection 46, and the fixing portion 47 is slid from the upper side to be engaged with the underhead portion of the bolt 81, which has been temporarily fixed to the hole 72 of the bracket 70. At that time, as explained above, since the guiding portion 48 functions as a guide when the fixing portion 47 is slid and engaged with the bolt 81, the assembling process may be readily performed. In this manner, the coupling member 40 is temporarily fixed to its attaching position.

Then, the upper end portion of the front wall 43 of the coupling member 40 is fixed to the patch member 60 of the exterior casing 21 by tightening the bolt 80 using the weld nut 72a. Also, the rear end portion of the side wall 44 of the coupling member 40 is fixed to the bracket 70 of the wheel house 9 by tightening the bolt 81 using the weld nut 72a. In this manner, the assembling process for the coupling member 40 is completed.

Next, the assembly procedure for the coupling member 50 will be explained with reference to FIG. 4.

First, the orientation of the coupling member 50 is maintained so as to be in a state more inclined towards the front as compared with the assembled state thereof, and the projection 56 used for temporarily fixing is engaged with the engaging hole 68 formed with the patch member 65 of the exterior casing 21.

Then, similar to the assembling procedure for the coupling member 40, the coupling member 50 is rotated around the projection 56, and the fixing portion 57 is slid from the upper side to be engaged with the underhead portion of the bolt 81, which has been temporarily fixed to the hole 77 of the bracket 75, to temporarily fix the coupling member 50 to its attaching position. After this, the upper end portion of the front wall 53 of the coupling member 50 is fixed to the patch member 65 of the exterior casing 21 by tightening the bolt 80 using the weld nut 67a. Also, the rear end portion of the side wall 54 of the coupling member 50 is fixed to the bracket 75 of the wheel house 9 by tightening the bolt 81 using the weld nut 77a. In this manner, the assembling process for the coupling member 50 is completed.

According to the embodiment of the present invention explained above, since the high voltage electrical packaging case 20 may be supported by the wheel houses 9 via the coupling members 40 and 50, the resonance frequency of the high voltage electrical packaging case 20 is increased, and the generation of humming noise due to the structural resonance may be surely prevented.

Also, since the coupling members 40 and 50 are bent at the outside of the high voltage electrical packaging case 20 and are connected to the corresponding wheel house 9, the coupling members 40 and 50 do not project towards the inside of the interior of the vehicle. Accordingly, the coupling members 40 and 50 do not occupy and reduce the interior space. Also, the use of the coupling members 40 and 50 according to the present invention has an advantage in preventing the increase in its weight as compared with the case where the thickness of the plate forming the exterior casing 21 is increased.

Moreover, since the coupling member 40 and 50 are detachably attached using the bolts 80 and 81, a maintenance process for the high voltage electrical packaging case 20 can be readily carried out.

Furthermore, according to the embodiment of the present invention explained above, it becomes possible to temporarily fix the coupling members 40 and 50 readily and surely to the assembly position thereof by engaging the projections 46 and 56 formed at the upper portion of the front wall 43 and 53 of the coupling member 40 and 50, respectively, with the patch members 60 and 65 of the exterior casing 21, and sliding and engaging the fixing portions 47 and 57 formed at the rear end portion of the side walls 44 and 54, respectively, with the bolt 81, which has been temporarily fixed to the brackets 70 and 75 of the corresponding wheel house 9.

In addition, since the relative positional shift between the high voltage electrical packaging case 20 and the wheel houses 9 in the vehicle width direction and the vehicle length direction is absorbed by the elongated holes 45 and 55 elongated in the vehicle width direction and by the fixing portions 47 and 57 enlarged in the vehicle length direction, the coupling members 40 and 50 are not distorted after being fixed using the bolts. Accordingly, it becomes possible to prevent the generation of residual stress.

Also, according to the embodiment of the present invention explained above, the size of the coupling members 40 and 50 may be reduced and the increase in weight may be suppressed to the minimum limit by effectively utilizing the wheel houses 9, which extend towards the inside the vehicle and are located in the vicinity of the high voltage electrical packaging case 20.

Note that the present invention is not limited to the above-mentioned embodiments by any means, and a structure may be adopted in which the coupling members 40 and 50 are attached by means of welding instead of using the bolts 80 and 81, for instance.

Also, although the coupling members 40 and 50 in the above-mentioned embodiments are made by press molding a steel plate and have a particular cross-sectional shape as mentioned above, it is possible to use other materials and cross-sectional shape for the coupling members 40 and 50 as long as the resultant members possess the strength and rigidity of the same degree.

Moreover, the coupling members 40 and 50 are not necessarily attached to the wheel houses 9, and may be attached to, for instance, rear inner fender.

Furthermore, although the projections 46 and 56 are disposed at the upper end portion of the front wall 43 and 53 of the coupling member 40 and 50, respectively, as engaging members for temporarily fixing, and the engaging rack portion 63 and engaging hole 68 corresponding to the projections 46 and 56 are disposed at the exterior casing 21, it is possible for the engaging hole to be formed at the upper end portion of the front wall 43 and 53 of the coupling member 40 and 50, respectively, and the corresponding projection is disposed at the exterior casing 21.

In addition, similar to the above, the attachment of the coupling members 40 and 50 between the rear end portion of the side walls 44 an 45 and the corresponding wheel house 9 may be reversed.

Also, it is possible that the structure of the coupling members 40 and 50 at the upper end portion of the front walls 43 and 53 may be replaced with the structure thereof at the rear end portion of the side walls 44 and 54.

Having thus described exemplary embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. A vibration-proof structure for a metallic electrical packaging case used in a vehicle, comprising:
    a metallic electrical packaging case;
    a coupling member which connects an outer wall of said metallic electrical packaging case and a member forming a side wall of said vehicle;
    a reinforcing member which supports an upper portion of said metallic electrical packaging case; and
    a side frame member which supports a lower portion of said metallic electrical packaging case, wherein said metallic electrical packaging case thus supported by said coupling member, said reinforcing member, and said side frame member is disposed diagonally along a back of a rear seat so that a resonance frequency of said metallic electrical packaging case is increased to prevent generation of humming noises.

2. A vibration-proof structure for a metallic electrical packaging case according to claim 1, wherein said coupling member includes:
    an engaging portion used for temporarily fixing said coupling member, said engaging portion being formed at one end of said coupling member; and
    an insertion engaging portion which is engaged with a portion of said member forming said side wall of said vehicle, said insertion engaging portion being formed at another end of said coupling member.

3. A vibration-proof structure for a metallic electrical packaging case according to claim 1, wherein said member forming said side wall of said vehicle is a wheel house.

4. A vibration-proof structure for a metallic electrical packaging case according to claim 2, wherein said member forming said side wall of said vehicle is a wheel house.

5. A vibration-proof structure for a metallic electrical packaging case according to claim 1, further comprising:
    a sealing member which is provided with said metallic electrical packaging case.

6. A vibration-proof structure for a metallic electrical packaging case according to claim 1, wherein
    said vibration-proof structure for a metallic electrical packaging case is placed between a rear seat and a trunk of said vehicle.

7. A vibration-proof structure for a metallic electrical packaging case according to claim 1, wherein
    said vibration-proof structure for metallic packaging case is applied to a cooling device.

* * * * *